UNITED STATES PATENT OFFICE.

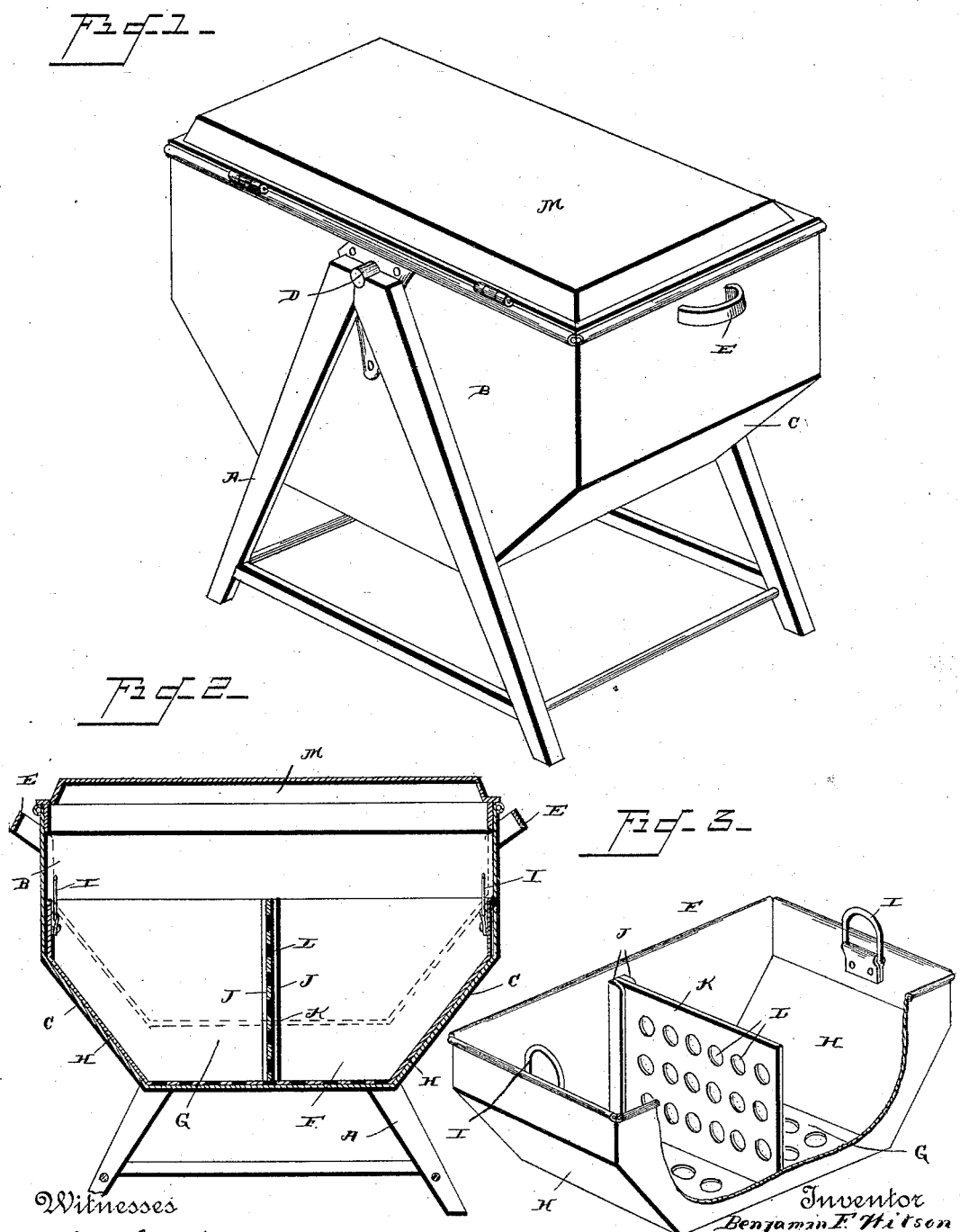

BENJAMIN F. WILSON, OF HARRODSBURG, KENTUCKY.

DISH-WASHER.

SPECIFICATION forming part of Letters Patent No. 431,305, dated July 1, 1890.

Application filed November 22, 1889. Serial No. 331,177. (No model.)

*To all whom it may concern:*

Be it known that I, BENJAMIN F. WILSON, a citizen of the United States, residing at Harrodsburg, in the county of Mercer and State of Kentucky, have invented a new and useful Dish-Washer, of which the following is a specification.

My invention relates to improvements in dish washers and drainers; and it consists in certain novel features hereinafter described and claimed.

In the accompanying drawings, Figure 1 is a perspective view of my improved dish-washer in its operative position. Fig. 2 is a longitudinal section of the same. Fig. 3 is a perspective view of the dish-pan removed and partly broken away.

In carrying out my invention I employ a supporting-frame A, and in the upper ends of this supporting-frame I locate the oscillating receptacle B, which may be of any desired size and is substantially rectangular, the lower corners being cut away, as shown at C. This receptacle is provided on its sides with trunnions D, which are journaled in the upper ends of the supporting-frame A, and it is provided at its ends with the handles E, by means of which it may be oscillated.

The dish-pan F is of the proper form and size to fit snugly within the receptacle B, and is provided with a flat perforated bottom G, through which water may pass into the receptacle, and upon which the pan may rest or sit when removed from the receptacle. The pan is further provided with the inclined portions H, by which the water will be directed to the flat bottom as it drains from the dishes.

The dish-pan is provided at its ends with the handles I, by means of which it may be removed from the receptacle B, and on the inner sides of the dish-pan, at the center of the same, I provide the vertical cleats or guides J, in which a sliding partition K, having perforations L, is mounted. The receptacle B is also provided with a hinged lid M, which fits snugly over the top of the receptacle, as clearly shown.

In practice the dishes are placed in the dish-pan and the same partially filled with water and soap or other cleansing material. The device is then oscillated or rocked upon the trunnions D, so as to cause the water to move against and between the dishes, thereby cleansing the same. The central partition in the dish-pan is pushed downward and prevents the dishes falling against each other, so as to be broken, while the perforations in said partition allow the water to pass freely therethrough, as will be readily understood. After the dishes have been cleansed the lid is removed and the dish-pan is then lifted from the receptacle B and placed on the lid. The perforated bottom of the dish-pan allows the water to pass from the same as it is lifted from the receptacle, so as to facilitate the draining of the dishes, and also supports the pan firmly and steadily when it is placed on the lid. By removing the central partition in the inner pan and supporting the said pan a slight distance above the bottom of the outer receptacle my improved machine will be adapted for use as a vegetable-steamer, as shown in dotted lines in Fig. 2.

It will be seen from the foregoing description that I have provided a dish-washer which is very simple in its construction and efficient in its operation.

By supporting the device in the manner shown and described it can be easily operated, and the water will thus be thrown violently from end to end of the pan, so as to thoroughly cleanse the dishes.

Having thus described my invention, what I claim, and desire to secure by Letters Patent, is—

In a dish-washing machine, the combination, with the metallic receptacle having a flat bottom, the supporting-frame A, and the trunnions D on said receptacle detachably engaging said frame, of the perforated pan F, fitting loosely within but of less depth than said receptacle, the whole adapted for use either as a washing-machine or a steamer, substantially as described.

In testimony that I claim the foregoing as my own I have hereto affixed my signature in presence of two witnesses.

BENJ. F. WILSON.

Witnesses:
P. E. BELL,
H. T. WILSON.